United States Patent [19]
Ulrich

[11] 3,771,585
[45] Nov. 13, 1973

[54] DEVICE FOR MELTING SPONGE METAL USING INERT GAS PLASMAS

[75] Inventor: Klaus-Herbert Ulrich, Essen, Germany

[73] Assignee: Fried. Krupp Gesellschaft mit beschrankter Haftung, Essen, Germany

[22] Filed: Mar. 6, 1972

[21] Appl. No.: 231,824

[30] Foreign Application Priority Data
March 4, 1971 Germany............... P 21 10 274.9

[52] U.S. Cl.................... 164/252, 219/121 P, 13/9, 75/10
[51] Int. Cl............................................. B22d 27/02
[58] Field of Search ................... 164/50, 52, 64, 80, 164/82, 250, 252; 219/121 P; 13/9, 34

[56] References Cited
UNITED STATES PATENTS
| | | | |
|---|---|---|---|
| 2,899,294 | 8/1959 | Siemons........................... | 164/52 X |
| 3,380,904 | 4/1968 | Goldberger......................... | 13/9 X |
| 3,404,078 | 10/1968 | Goldberger......................... | 13/9 X |
| 3,496,280 | 2/1970 | Dukelow et al................. | 219/121 P |

FOREIGN PATENTS OR APPLICATIONS
| | | | |
|---|---|---|---|
| 150,769 | 4/1953 | Australia.............................. | 164/82 |
| 1,288,983 | 2/1962 | France...................................... | 13/9 |
| 809,561 | 2/1959 | Great Britain.................. | 219/121 P |

*Primary Examiner*—R. Spencer Annear
*Attorney*—George H. Spencer et al.

[57] ABSTRACT

A device for melting sponge metal and especially suitable for melting sponge metals of Groups 4b and 5b of the periodic system, including a hermetically sealed, cooled mold, a transferred-arc noble gas plasma burner providing a vertical plasma for acting on sponge metal piled in the mold, and an insulating jacket surrounding the burner and screening the plasma from sponge metal situated laterally to the plasma, so that the plasma may be confined substantially completely to a direction of steepest potential gradient.

7 Claims, 1 Drawing Figure

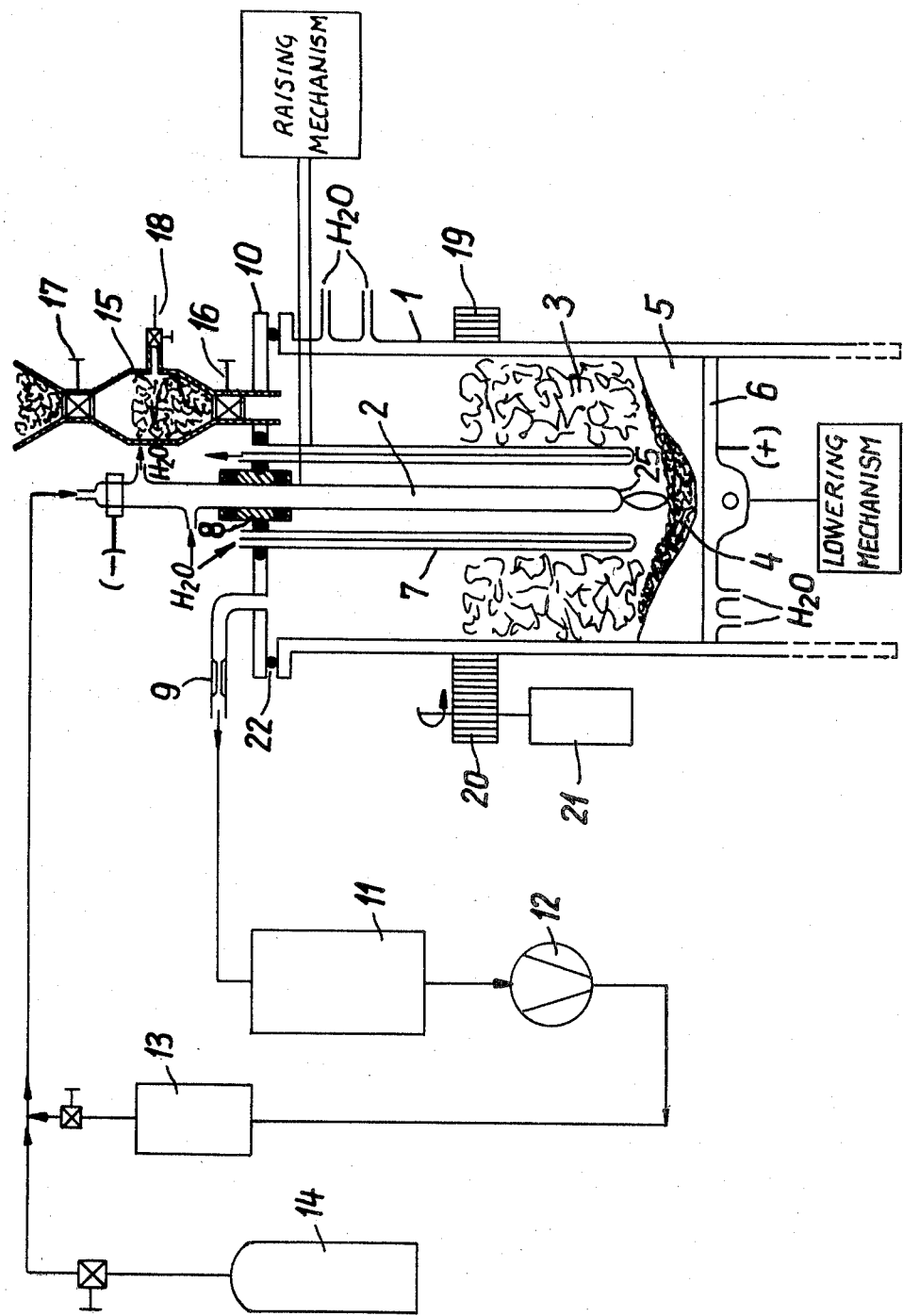

DEVICE FOR MELTING SPONGE METAL USING INERT GAS PLASMAS

BACKGROUND OF THE INVENTION

The present invention relates to a device for melting sponge metal in a cooled, hermetically sealed mold using inert gas plasmas.

Processes and devices are already known for densifying metals of Groups 4b and 5b of the periodic system. Reference herein to groups of the periodic system are based on the periodic table appearing on the inside of the back cover of the 49th edition of the HANDBOOK OF CHEMISTRY AND PHYSICS, The Chemical Rubber Co., Cleveland, Ohio. These metals, which have been won by reduction, are melted from the sponge metal remaining after the reduction, for example titanium sponge produced by reduction of $TiCl_4$ by magnesium metal. Thus, a densified product is obtained. The dense ingots that are obtained after such melting are subsequently worked further by forging and rolling.

It has been the practice to melt highly reactive sponge containing metals from the fourth and fifth groups of the periodic table by first carrying out a preliminary densification by forming them into an electrode. Material is then melted off the electrode in high vacuum using an electric arc or electron bombardment. The metal drops into a water-cooled metal pot and solidifies there to an ingot. A large part of the impurities such as nitrogen, oxygen, and chlorine are evaporated and evacuated by vacuum pumps. The use of water-cooled metal molds prevents a reaction of the metal of interest with ceramic or graphite-containing crucible material.

SUMMARY OF THE INVENTION

An object of the invention is to melt sponge metals of the above-mentioned types in simple manner using noble gas plasmas without special preliminary handling, such as preliminary densification.

This as well as other objects which will become apparent in the discussion that follows are achieved, according to the present invention, by a device for melting sponge metal and especially suitable for melting sponge metals of Groups 4b and 5b of the periodic system, including a hermetically sealed mold, means for cooling the mold, a transferred-arc noble gas plasma burner means for creating a vertical plasma for acting on sponge metal piled in the mold, and an insulating jacket means surrounding the burner means for screening the plasma from sponge metal situated laterally to the plasma and for confining the plasma substantially completely to a direction of steepest potential gradient.

GENERAL ASPECTS OF THE INVENTION

The above object is obtained with a device using a transferred-arc noble gas plasma burner extending vertically into a pile of sponge metal having a counter electric potential. The burner is surrounded by a cylindrical insulating jacket for the purpose of preventing a canceling of the potential difference by laterally situated sponge metal. The insulating jacket is so arranged with respect to the slope of the sponge metal pile that the spot of plasma flame impingement on the sponge metal pile lies almost completely in the direction of the steepest potential gradient.

As noble gas plasma burner, the type working for example with argon and applied for carrying out metallurgical reactions principally in highly alloyed steels in conventional furnaces lined with ordinary ceramic materials is suitable, see J. Metals, December, 1962, pages 907 to 911; Problemy Projektowe Hutnictwa, October, 1969, pages 301 to 308.

A special advantage of the type of melting present in this invention is that the step of making from the sponge metal a special electrode, which is later to be melted, is eliminated. One just proceeds in simple manner using the plasma principle of the transferred arc.

In an especially useful structure of the invention, a sort of annular chamber is provided between the insulating jacket and a vertical wall of a mold collecting and forming the metal as it becomes molten. The sponge metal to be melted is situated in this annular chamber. At the top of the annular chamber is an opening for leading off the hot, extinguished plasma gases. This structure provides the advantage that the hot gases led away from the plasma pass through the sponge metal to be melted and thus provide a preheating of the sponge metal approaching the melting zone.

In another development of the structure of the invention, there is at least one vacuum chamber provided at the upper end of the mold for sucking off gases present in the sponge metal material to be introduced into the mold. The sponge iron moves through this vacuum chamber before being introduced batch-wise into the mold. The vacuum chamber is provided with valves on its upper and lower ends, and only one of these valves is opened at a time.

To provide a uniform distribution of the sponge metal coming from the one or more parallelly arranged vacuum chambers into the mold, the mold is rotated about the longitudinal axis of the plasma burner in a further development of the invention.

According to the invention, the melting of sponge metal to an ingot includes the moving of the plasma burner, together with the insulating jacket surrounding it, upwards. This causes the forming of a solidified metal ingot which grows slowly upwards beneath a liquid melt.

Conversely, another technique of the invention for continuously forming a metal ingot is to lower the floor of the mold during the melting process; the solidifying melt then forms a metal ingot growing downwards. This makes possible the production of a solid metal ingot in a sort of strand casting method. To this end, the mold floor is constructed to be continuously lowerable in the mold.

BRIEF DESCRIPTION OF THE DRAWING

The sole FIGURE of the drawing is a partially schematic elevational view of the device and method of the invention.

DESCRIPTION OF THE PREFERRED EMBODIMENTS

Referring to the FIGURE, there is shown a water-cooled, hermetic metallic mold 1 and a plasma burner 2 mounted in mold 1. The burner 2 is emitting a plasma flame which is striking a sump region 4 of molten metal. The molten metal is continuously solidifying in the region 5 by the walls of the mold. As shown by the polarity symbols in the FIGURE, the plasma burner 2 is of the transferred-arc type. The plasma flame forms between the plasma burner 2 and the counter potential on the mold.

Because of the electrical conductivity of the mold 1 and the sponge metal 3, the counter potential applied to the mold is present in the sponge metal 3 also. In order that no equalizing of the potentials of the mold and plasma burner can occur by way of the unmelted sponge metal 3, the plasma burner 2 is surrounded by a cooled cylindrical insulating jacket 7 which is itself insulated from the burner. This insulating jacket 7 holds the sponge metal, which is continually sinking during the melting and which is at the electrical potential of the mold 1, from the electrically conductive, oppositely charged mantle 25 of the plasma burner 2. The provision of jacket 7 around the plasma burner 2 causes the plasma flame to burn stably in the region of the steepest potential gradients, namely in the direction of the longitudinal axis of the plasma burner acting as cathode, between the plasma burner and the metal sump 4. The insulating of jacket 7 from the plasma burner 2 is achieved, for example, by the insulating insert 8 in the mold lid 10.

The noble gas fed into the plasma burner 2 forms the plasma flame. The hot plasma gases flow through the column of still unmelted sponge metal 3, preheat this metal, and leave the hermetically sealed mold through a nozzle 9 in the mold lid 10.

Since the economy of the melting method according to the invention is significantly influenced by the consumption of noble gas, the gas leaving mold 1 through nozzle 9 is led through a gas-cleaning system 11, where the impurities evaporated from the metal during melting are separated. The cleaned noble gas is then led through a compressor and through a vessel 13 containing a buffer volume of the gas, back to the plasma burner. Any losses of noble gas are compensated by a noble gas storage container 14.

The feeding of the sponge metal 3 is through the vacuum chamber 15 and is controlled to make up for sponge metal 3 lost by melting. The quantity of sponge metal situated in vacuum chamber 15 is exposed to a vacuum of about $10^{-2}$ Torr for the purpose of removing gas contained in the pores of the sponge metal and for the purpose of removing impurities volatilizing at room temperature before the sponge metal is brought through the lower valve 16 into the mold 1. Following the closing of the lower valve 16, the upper valve 17 of the vacuum chamber 15 is opened, so that a new quantity of sponge metal can be readied in chamber 15. With valves 16 and 17 closed, the vacuum chamber is evacuated through side valve 18. In order to get a uniform distribution of sponge metal within the mold 1, mold 1 is turned one revolution right or left about the longitudinal axis of the plasma burner using drive 21, pinion 20, and ring gear 19. The mold lid 10 remains in position during this turning, as does the insulating jacket 7. The relative sliding between the mold and its lid occurs at seal 22.

The water-cooled floor 6 of mold 1 is lowered by an appropriate floor lowering mechanism as a function of the rate of melting in the mold, so that as the solidified metal ingot forms, the distance between plasma burner 2 and metal sump 4, and consequently the length of the plasma flame, remain constant. Such lowering mechanisms may operate continuously as in the continuous casting of, for example, steel ingots in the electroslag remelting process, see Problemy Projektowe Hutnictwa, cited above, and Steel in the USSR, January 1971, pages 40 to 42, or in a plasma remelting process such as is shown in German Patent Application P 19 41 282.9 of Aug. 13, 1969, published Feb. 19, 1970. The same effect can also be obtained by a raising mechanism for moving the burner 2 and the insulating jacket 7 upwards as a function of the rate of melting. The hermetic sealing of mold 1 is maintained using conventional stuffing box, packing, or O-ring sealing systems.

Example to explain the operation of the melting device according to the invention:

Before starting the melting process, an approximately 50 mm high pile of, for example, titanium sponge of 3 to 30 mm size is introduced into the water-cooled crucible. After sealing the furnace system from the atmosphere, the air present in the furnace system is removed by a vacuum pump until an end pressure of $10^{-2}$ Torr is obtained. Following this, the plasma burner with its insulating jacket is lowered onto the titanium sponge pile in the crucible and the plasma beam ignited by short-circuiting. New titanium sponge of 3 to 30 mm size is fed through the air-lock system as required by the rate of melting. In the air-lock system, before being fed into the furnace, the sponge is exposed to a vacuum of $10^{-2}$ Torr to remove impurities and the air contained in the pores of the metal sponge.

The plasma burner, which is rated at 250 kW, operates in a water-cooled copper crucible with an inside diameter of 280 mm. The outside diameter of the insulating jacket is 150 mm and that of the burner 60 mm. The cooling water flows through the burner at a rate of 40 litres/min. and through the copper crucible at a rate of 60 litres/min. The electric current applied to the burner is approx. 3,500 ampere at an argon gas flow of 10 litres/min. Melting rates of approx. 100 kg of titanium per hour are achieved.

The level of the insulating jacket bottom is adjusted to the level of the plasma burner nozzle so that, with a definite slope of the titanium sponge pile, the titanium sponge is kept away from the plasma burner nozzle far enough to allow the plasma beam to impinge essentially vertically, i.e., parallel to the burner axis, on the liquid metal sump. The steeper the slope of the metal sponge material, the higher may be the level of the insulating jacket bottom relative to the plasma burner nozzle. The slope of the titanium sponge material may be determined by measuring the angle of repose formed by a heap of titanium sponge.

The plasma burner used corresponds to the known type of transferred-arc plasma burner as developed by Union Carbide Corporation, New York, (described, for example, in the German patent application P 1 109 285 of Sept. 21, 1959) and by Siemens AG, Berlin/Munich, West Germany, (described, for example, in the German patent application P 1 790 209 of Sept. 28, 1968).

During the melting process, either the plasma burner with its insulating jacket is raised as a function of the melting rate or, alternatively, the corresponding metal ingot is lowered. Ingot lowering or burner raising is carried out at a rate of approx. 15 mm per minute. The height of the metal sponge pile above the molten ingot is preferably between 100 mm and 200 mm.

It will be understood that the above description of the present invention is susceptible to various modifications, changes and adaptations, and the same are intended to be comprehended within the meaning and range of equivalents of the appended claims.

I claim:

1. A device for melting sponge metal and especially suitable for melting sponge metals of Groups 4b and 5b of the periodic system, comprising a hermetically sealed mold, means for cooling said mold, a transferred-arc noble gas plasma burner means for creating a vertical plasma for acting on sponge metal piled in said mold, and an insulating jacket means surrounding said burner means for screening said plasma from sponge metal situated laterally to said plasma and for confining said plasma substantially completely to a direction of steepest potential gradient.

2. A device as claimed in claim 1, wherein said insulating jacket means and said mold mutually form a chamber extending vertically from said plasma, said mold including means for feeding sponge metal down into said chamber and means for evacuating extinguished plasma gases from upper portions of said chamber.

3. A device as claimed in claim 2, further comprising vacuum means for removing gases from sponge metal before entering said means for feeding.

4. A device as claimed in claim 2, further comprising means for rotating said mold about a longitudinal axis of said plasma burner for obtaining a uniform distribution of sponge metal in said chamber as it is fed from said means for feeding.

5. A device as claimed in claim 1, further comprising means for moving said burner means and insulating jacket means upwards as a function of the rate of melting of sponge metal.

6. A device as claimed in claim 1, further comprising means for moving a floor of said mold downwards during melting of sponge metal.

7. A device as claimed in claim 1, further comprising means for moving a floor of said mold continuously downwards during melting of sponge metal.

* * * * *